J. W. GIBSON.
PATTERN FOR STUMP BURNING FIREPLACES.
APPLICATION FILED NOV. 10, 1911.
1,113,774.  Patented Oct. 13, 1914.
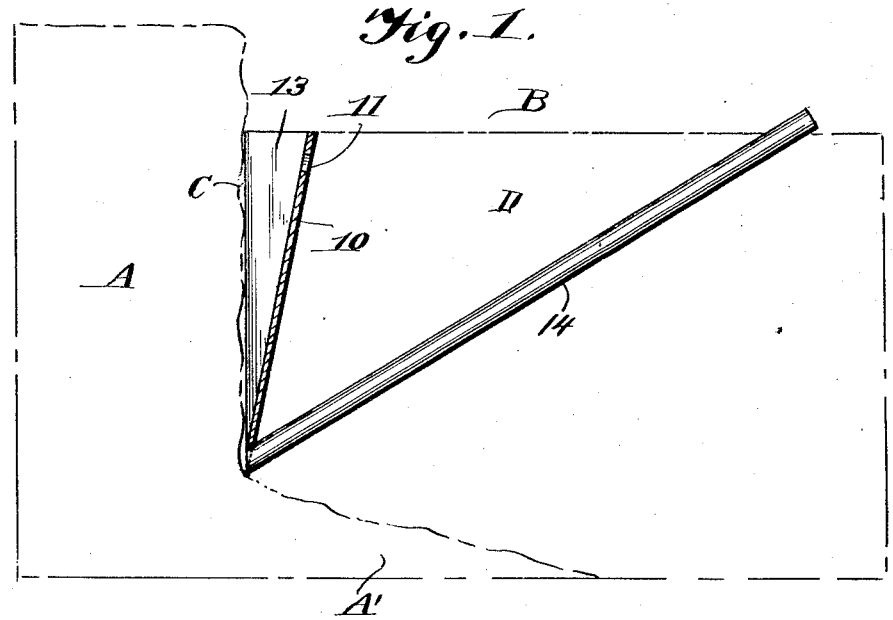
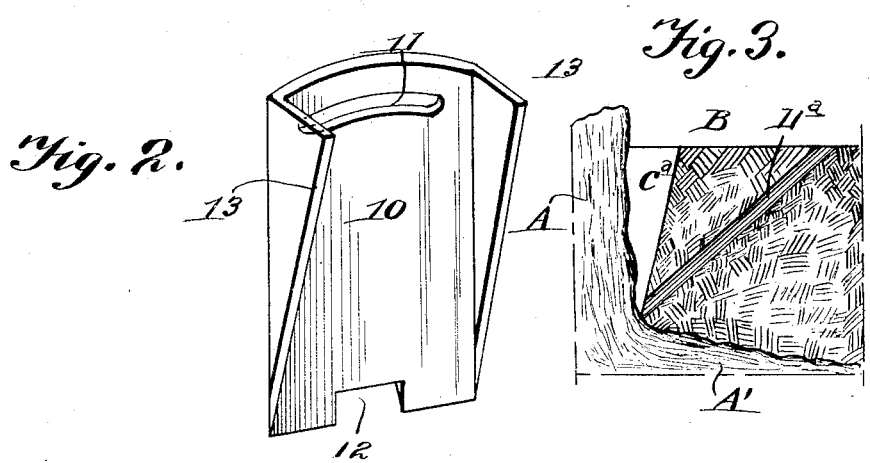
Witnesses
William C. Linton
Charles P. Wilson
Inventor
Joseph W. Gibson
By Wm. C. McIntire
Attorney

UNITED STATES PATENT OFFICE.

JOSEPH W. GIBSON, OF BRANTLEY, ALABAMA.

PATTERN FOR STUMP-BURNING FIREPLACES.

1,113,774.  Specification of Letters Patent.  Patented Oct. 13, 1914.

Application filed November 10, 1911. Serial No. 659,636.

*To all whom it may concern:*

Be it known that I, JOSEPH W. GIBSON, a citizen of the United States, residing at Brantley, in the county of Crenshaw and State of Alabama, have invented certain new and useful Improvements in Patterns for Stump-Burning Fireplaces; and I do hereby declare the following to be a full, clear, and exact description of the invention, such as will enable others skilled in the art to which it appertains to make and use the same.

This invention relates to stump burners and has for its object to provide a means whereby a depression may be formed adjacent to a stump, for the purpose of containing fire, said depression coöperating with a longitudinal opening for the purpose of producing a draft.

Heretofore it has been customary in the annihilation of stumps to remove the same from the ground, forming a pile, and burning said pile.

It is the object of the present invention to overcome this objectionable feature of removing the stumps from the ground, by providing a means whereby a depression or fireplace may be built in the ground adjacent the stump, said fireplace or depression coöperating with a longitudinal opening extending obliquely from the base thereof to the surface of the earth through which the air circulates, producing a draft. This construction consumes the stump upon which it operates, without removing the same from the ground, and permits the ashes to be readily removed and the excavation filled.

With the above and other objects in view, this invention consists in the construction, combination and arrangement of parts, all as hereinafter more particularly described, claimed and illustrated in the accompanying drawings, wherein:

Figure 1 is a diagrammatical view, illustrating a stump coöperating with the mold or burner forming the subject matter of the present invention; Fig. 2 is a perspective view of said mold or burner; and Fig. 3 is a diagrammatical view, illustrating the fireplace and its coöperating draft.

The stump burner forming the subject matter of the present invention comprises a plate having a transverse slot adjacent to the upper terminal thereof, and an annular depression at the lower terminal. Upon each of the longitudinal sides of said plate is a pair of right angular flanges, which are tapered from the top of said plate to the base thereof. The upper terminals of the said flanges are adapted to rest flush with the upper surface of the ground when the same is driven therein.

In applying the present invention to the ground, a space is dug adjacent to the stump and superposed above the tap root thereof about twenty inches in depth, a ditch then extending from said space rearwardly for about three feet, the bottom of said ditch sloping from the base of said depression to the surface of the ground. A rod is then placed in the base of said ditch and the stump burner or mold forming the subject matter of the present invention is then placed against the stump in such a manner that the depression formed in the lower terminal thereof spans the rod aforesaid. The earth is then packed over the rod and against the outer surface of the plate, the same being clearly tamped and formed into the solid structure. The rod and stump burner are then removed, leaving a depression or fireplace adjacent to the stump and an elongated draft extending from about three feet away from the stump to the base of said fireplace or depression. Fuel is then placed in this depression or fireplace, then lighted, and will gradually and readily consume the stump.

Reference being had more particularly to the drawings, A indicates a stump, and B the ground line adjacent thereto. A depression C is cut into the ground adjacent to the stump over the tap root A', said depression coöperating with a ditch D which extends from said depression through a distance of approximately three feet. The base of the ditch D slopes from the base of the depression C to the surface B of the ground.

The mold forming the subject matter of the present invention comprises a plate 10 having a transverse slot 11 formed adjacent to the upper terminal thereof, and an angular depression or recess 12 formed in the lower terminal. The flange 13 is formed on each side of the plate 10, the upper terminals of said flanges adapted to rest flush with the ground line B, while the said flanges taper from said upper terminals to the base of the plate 10. The slot 11 forms a means whereby the plate 10 may be engaged and withdrawn from the ground after the fire has been formed.

After the plate 10, or stump burner, forming the subject matter of the present invention is placed in the depression C, a rod 14 of any suitable shape is placed in the base of the ditch D extending from said depression C, said rod being engaged by the angular recess 12 formed in the lower terminal of the plate 10. Earth is then packed and tamped in the space between the plate 10 and the rod 14 until a solid structure is formed. The plate 10 is then removed through the instrumentality of the slot 11 and the rod 14 is drawn from the suitable passage which the same forms when the dirt is tamped in the ditch D. This forms a fireplace $C^a$ provided with a draft $D^a$ which extends from the base of the said fireplace or depression $C^a$ to the surface of the ground substantially three feet distant from the said fireplace. Fuel is then placed in the depression or fireplace $C^a$, and is lighted, and will burn freely and readily and consume the stump in its operation.

Having thus fully described by invention, what I claim as new, and desire to secure by U. S. Letters Patent, is:

1. The combination with a rectangular plate provided with downwardly tapering triangular wings formed at right angles to and ending in, the same plane as that of said plate, said plate also provided near its upper end with an opening, and having a portion near its lower end cut away; of a rod adapted to coöperate with said cut away portion when said rod and plate are placed in position.

2. A pattern for a stump burning fire place to be formed in the ground adjacent to a stump, comprising a rectangular plate provided with a transverse slot adjacent to its upper end, and a rectangular notch centrally of its lower end, triangular wings formed with the plate disposed at right angles thereto on the same side of the plate and tapering to the bottom thereof, a rod coöperating with said pattern to form a tubular passage in the ground from the rectangular notch to a point remote from the stump.

In testimony whereof I affix my signature in presence of two witnesses.

JOSEPH W. GIBSON.

Witnesses:
M. W. RUSHTEN,
AUBREY HORN.

---

Copies of this patent may be obtained for five cents each, by addressing the "Commissioner of Patents, Washington, D. C."